No. 655,867. Patented Aug. 14, 1900.
W. HINDLEY & J. W. HARDING.
KNOTTER.
(Application filed Dec. 2, 1897.)
(No Model.) 7 Sheets—Sheet 1.

INVENTORS
William Hindley and
Joseph W. Harding,
BY
W. B. Hutchinson
ATTORNEY.

No. 655,867. Patented Aug. 14, 1900.
W. HINDLEY & J. W. HARDING.
KNOTTER.
(Application filed Dec. 2, 1897.)
(No Model.) 7 Sheets—Sheet 2.

WITNESSES:
John D. Whistler
J. V. E. Criswell

INVENTORS
William Hindley and
Joseph W. Harding
BY
W. B. Hutchinson
ATTORNEY.

THE NORRIS PETERS CO., PHOTO-LITHO., WASHINGTON, D. C.

No. 655,867. Patented Aug. 14, 1900.
W. HINDLEY & J. W. HARDING.
KNOTTER.
(Application filed Dec. 2, 1897.)
(No Model.) 7 Sheets—Sheet 3.

No. 655,867. Patented Aug. 14, 1900.
W. HINDLEY & J. W. HARDING.
KNOTTER.
(Application filed Dec. 2, 1897.)
(No Model.) 7 Sheets—Sheet 4.

WITNESSES:
John T. Whistler
J. A. E. Criswell

INVENTORS
William Hindley and
Joseph W. Harding
BY
W. B. Hutchinson
ATTORNEY.

No. 655,867. Patented Aug. 14, 1900.
W. HINDLEY & J. W. HARDING.
KNOTTER.
(Application filed Dec. 2, 1897.)

(No Model.) 7 Sheets—Sheet 5.

No. 655,867. Patented Aug. 14, 1900.
W. HINDLEY & J. W. HARDING.
KNOTTER.
(Application filed Dec. 2, 1897.)
(No Model.) 7 Sheets—Sheet 6.

WITNESSES:
John D. Whistler,
J.A.E. Criswell,

INVENTORS
William Hindley and
Joseph W. Harding
BY
W. B. Hutchinson
ATTORNEY.

No. 655,867. Patented Aug. 14, 1900.
W. HINDLEY & J. W. HARDING.
KNOTTER.
(Application filed Dec. 2, 1897.)
(No Model.) 7 Sheets—Sheet 7.

WITNESSES:
John D. Whistler
J.A.E. Criswell

INVENTORS
William Hindley and
Joseph W. Harding
BY
W. B. Hutchinson
ATTORNEY.

UNITED STATES PATENT OFFICE.

WILLIAM HINDLEY, OF HOBOKEN, NEW JERSEY, AND JOSEPH W. HARDING, OF NEW YORK, N. Y., ASSIGNORS, BY MESNE ASSIGNMENTS, TO THE DIAMOND WOOD COMPANY, OF NEW JERSEY.

KNOTTER.

SPECIFICATION forming part of Letters Patent No. 655,867, dated August 14, 1900.

Application filed December 2, 1897. Serial No. 660,479. (No model.)

*To all whom it may concern:*

Be it known that we, WILLIAM HINDLEY, of Hoboken, in the county of Hudson and State of New Jersey, and JOSEPH W. HARDING, of New York, (Brooklyn,) in the county of Kings and State of New York, have invented certain new and useful Improvements in Knotters, of which the following is a full, clear, and exact description.

This invention relates to cord-knotters, but more particularly to a device or devices such as disclosed in our application, Serial No. 658,255, filed November 12, 1897.

The primary objects of the invention are to simplify the construction of knotters adapted for use in connection with wood-bundling machines and to provide an efficient device which will tie a knot of such a nature as will not be liable to slip or become disconnected, as a reef or square knot, close to a practically-unyielding body.

Other objects are to provide positive means for guiding the cord or thread while it is being carried forward, to provide means arranged on the cord-carrier for cutting or separating the cord at the proper time, and generally to simplify and improve various parts of such devices.

A further object of the invention is to provide a knotter which may be used for various purposes and which may be employed singly or in connection with a series of such devices, so that a number of knots may be tied in unison.

The invention will be hereinafter more particularly described with reference to the accompanying drawings, which form a part of this invention, and then pointed out in the claims at the end of the description.

In the drawings, wherein similar numerals of reference designate similar parts, Fig. 6ª is a detail vertical sectional view, partly broken away, of a portion of the mechanism employed for giving a rearward or outward movement to the needle-bar.

The description and operation immediately to follow will be confined to a single device, inasmuch as where several are used they may be similarly constructed and operated, and later reference will be made to how several of such devices may be connected and operated in unison in order to simultaneously tie a series of knots so spaced apart that the body or material may be ultimately separated into independent packages.

The cord-carrier 10 has a slide 11, adapted to move back and forth in a suitable support 12, and has at one end thereof a fixed jaw 13 and a movable jaw 14, which may be secured to a bolt 15, the cord being passed from a suitable source of supply (not shown) and adapted to be rigidly held by the jaws, as will be hereinafter explained. The slide 11 has upon its outer upper surface a rack 16, which in this case connects the slides of two carriers, though where the knotters are used independently of each other, as in a single device, the rack may be connected to or formed on one side only. This rack is in mesh with a segmental or other gear 17, which is arranged to oscillate on the transverse shaft 18. The segmental gear 17 has a cam projection 19 thereon, which at the proper time is engaged by cams 20 and 21, projecting outwardly from the disk 22, which is revoluble on the shaft 23 in order that when the disk 22 is rotated the segmental gear will be oscillated and through the rack 16 will advance the cord-carrier 10 forward or inwardly, while the reverse direction of the carrier is obtained through the lever 24, pivoted at one end thereof, as at 25, to the segmental gear and having its other end, as at 25ª, arranged to be successively engaged by the cams 26, 27, and 28 on the transverse shaft 23, as shown in dotted lines in Fig. 15.

Figures 3, 4:
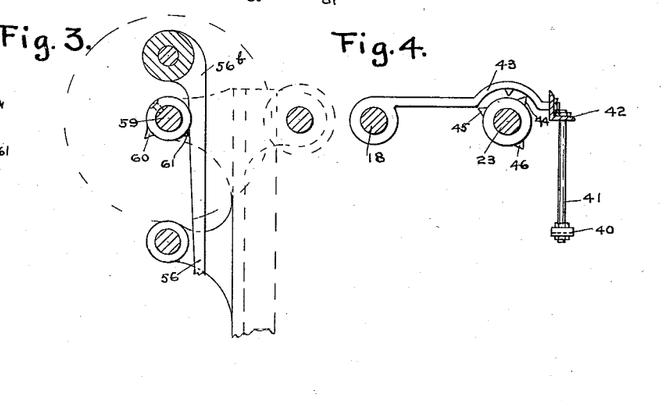
Fig. 3 is a vertical sectional view, partly broken away, taken on the line III III of Fig. 1.
Fig. 4 is a detail sectional view of a portion of the mechanism for operating the movable jaw of the cord-carrier and the blade or knife for cutting the cord.
Figures 14, 15, 16:
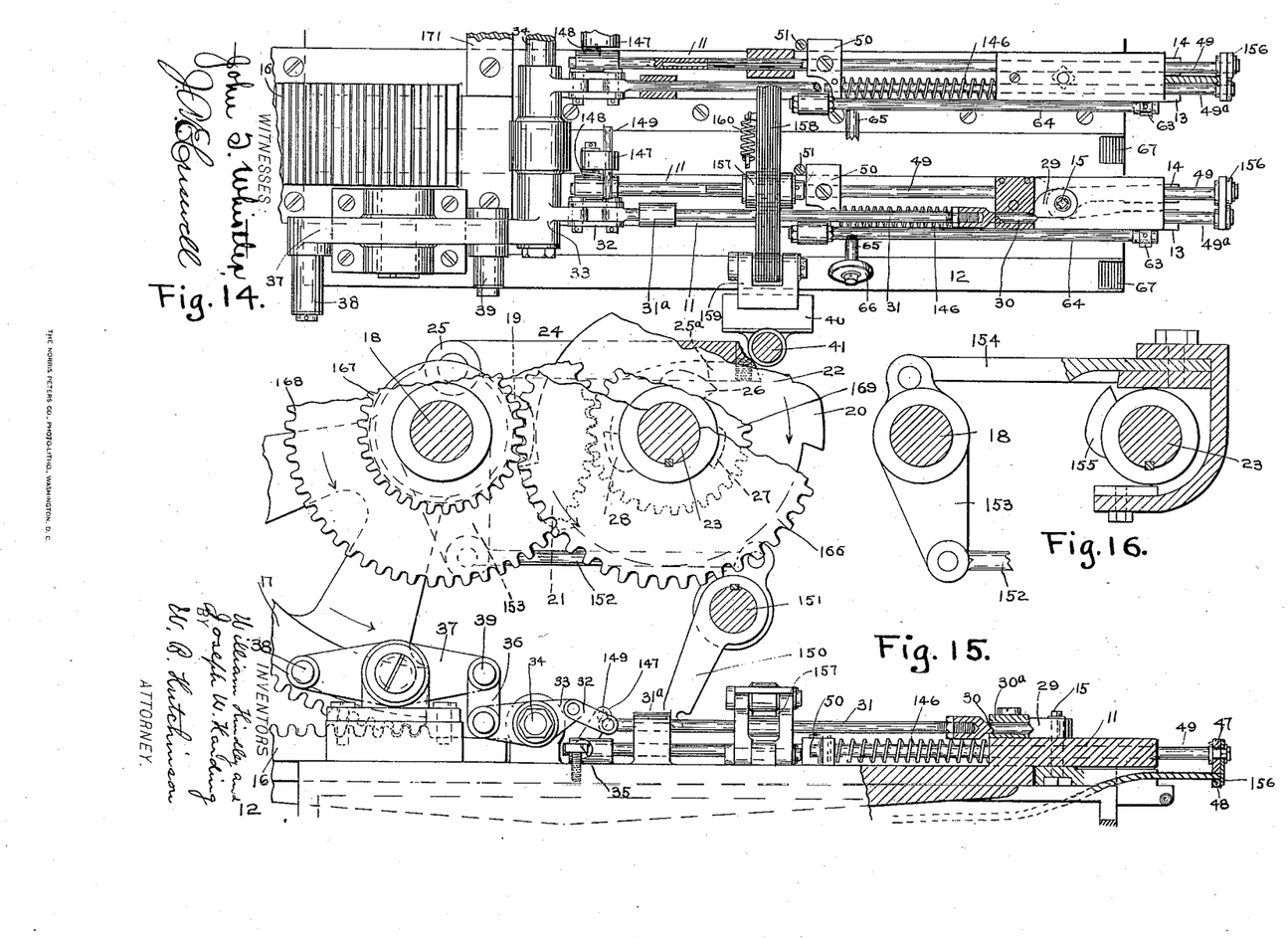
Fig. 14 is a plan view, partly in section and partly in elevation, of the cord-carrier and support, illustrating how two of such devices may be connected so as to operate in unison.
Fig. 15 is a side elevation, partly in section, of the cord-carrier and support, illustrating the mechanism, which is partly broken away, for operating the cord-carrier and parts arranged thereon.
Fig. 16 is a detail vertical section representing in full lines a portion of the mechanism for advancing the guide-bar or cutter-head for shifting the bend of the loop immediately as the nipper and cord-carrier are operated to complete the knot.

To move the clamping-jaw 14 of the cord-carrier, the pivotal bolt 15 has a polygonal head fitting a like recess in a portion of the jaw or is otherwise arranged to rotate with said jaw and has a cam 29 secured to its upper end. This cam has a portion thereof normally in the path of movement of the inner beveled end of the cam-rod 30, the latter being slidably held in a bearing, as 30ª, upon the slide 11, as shown in Figs. 14 and 15. The cam-rod 30 may be adjustably secured to the rod 31, which has its outer portion slidably arranged in a bearing, as 31ª, and is connected to a link 32, having one end thereof pivoted to a rocking block 33, the latter being pivoted to a suitable bearing or secured to the rock-shaft 34 and forming with the link a toggle-joint, so that when the block 33 is rocked on its pivot to throw the outer end of the link 32 downwardly the rod 31 will be advanced or forced inwardly and by engaging the cam 29 will move the jaw 14 so as to grasp the thread or cord, the link 32 at this time resting upon a set-screw, as 35, so as to be slightly below the longitudinal center of the rod 31 in order to readily hold and lock said rod in its advanced position. The rocking block 33 may be connected to the link 36, which has one end thereof pivoted to the rocking arm 37, this arm being provided with outwardly-projecting studs or bolts 38 and 39, adapted at different times when the cord-carrier is moved forward to be in the path of movement of the vertically-movable bracket 40, so that when the said bracket is moved the arm 37 will be tilted or rocked upon its pivot in order to impart movement to the rocking block 33 and operate the clamping-jaw 14, as already explained. The bracket 40 may be secured adjustably or otherwise to a rod 41, which at its upper end is secured to an angle plate or iron 42, carried by the inner end of the lever 43, Fig. 4, which at its outer end is arranged to oscillate on the transverse shaft 18, the lever 43 being successively engaged by the cams 44, 45, and 46 on the transverse shaft 23 in order that the rod 41 and bracket 40 may be raised at the proper and at different times, according to the position of the carrier 10.

The slide 11 has a guide bar or head 47 slidably held thereon and adapted to fit in a recessed or cut-away portion of the clamping-jaws or slide when in one position and has arranged thereon a roller, as 48, between which and the guide-bar the cord is adapted to rest and be supported. This guide bar or head may be secured to the slidable rods 49 and 49ª, arranged in suitable bearings on the slide 11 and connected together by a yoke or block 50, which is adapted to engage a pin or projection 51 on the support 12, so that as the slide is moved rearward the block or yoke 50 by engaging the pin or projection 51 will force the rods 49 and 49ª and the guide-bar 47 forward or inwardly, as shown in the drawings, the backward or outward movement of the guide-bar and rods being effected by coming in contact with an opposed portion of the machine when the carrier is advanced inwardly, as will be hereinafter explained.

In order that lateral movement may be imparted to the cord-carrier and its support, so that the loop when formed may be more readily folded or doubled upon itself, we may arrange the support 12 so as to slide transversely of the machine in the frame 52. A lever 53, pivoted intermediate its ends to the frame 52, as at 54, has one end thereof secured to the support 12 and its other end connected to a link, as 55. This link has one end connected to a lever 56, arranged to oscillate on a stud 56ª, carried by the frame of the knotter, and has its upper portions 56ᵇ and 56ᶜ in different planes, the portion 56ᶜ, Figs. 1 and 2, being adapted to be engaged by the cams 57 and 58 for forcing the support 12 outwardly transversely of the machine, while the portion 56ᵇ is engaged at the proper time by the cams 60 and 61 on the shaft 59 for forcing the support in the opposite direction.

The clamping-jaw 13 of the cord-carrier 10 may have a retaining bar or bolt 62 slidingly held therein, which is adapted to be forced across the space between this jaw and the jaw 14 in order to support the lower side of the loop while the same is being folded. This retaining bolt or bar 62 has its outer end connected to an arm 63, which depends from an oscillatory shaft or rod 64, this latter rod being arranged in bearings upon the carrier 10. To the rod 64 is secured a shaft or stud 65, on the outer end of which may be arranged a wheel 66, adapted to ride or roll upon the support 12 to rock the shaft 64 and throw the bar 62 outwardly, as shown at the right in Fig. 17, while the reverse movement is secured through the weight of the shaft 65 and wheel 66 when the cord-carrier is advanced sufficiently to remove the wheel from the support, a notched beveled portion, as 67, being arranged in said support in order that the wheel 66 may be more readily raised or gradually lowered during the movement of the carrier. The cord, when grasped by the clamping-jaws 13 and 14 and the latter moved forward, will be engaged by the gripper 68. This gripper has its jaws or members pivotally held together, and one of the jaws, as 68ᵃ, is normally pressed toward the other by means of a spring 69, arranged around the bolt 70, the releasing of the jaws being secured through the cam 71, Fig. 10, arranged upon the longitudinal shaft or rod 72. This latter rod has an arm 73, Fig. 8, secured thereto, which is connected to the lower end of a rod 74, the upper end of which is connected to an angle plate or iron 75, arranged upon the inner end of the lever 76. This lever 76 has one end pivoted to a portion of the frame, Fig. 7, and is adapted to be engaged by the cam 77, secured to the shaft 78, so that when the latter rotates the cam will engage the lever 76 and will raise the same, so as to lift the rod 74 and arm 73 and rock the shaft 72 in its bearings in the head 78ᵃ.

Figures 5, 7, 8:
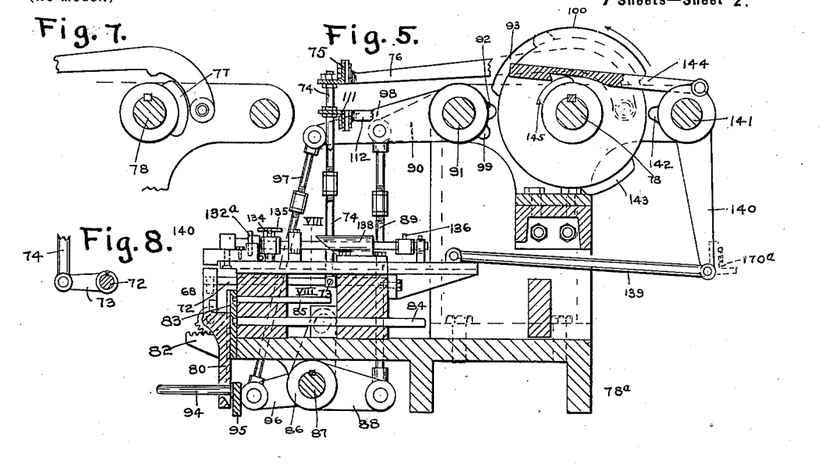
Fig. 5 is a vertical sectional view, partly in elevation, through the knotter-head, taken on the line V V of Fig. 10.
Fig. 7 is a detail vertical sectional view, partly broken away, showing in full lines a portion of the mechanism for operating the movable jaw of the gripper.
Fig. 8 is a detail vertical sectional view, taken on the line VIII VIII of Fig. 5, illustrating the connection between the vertically-movable rod and the oscillatory shaft which carries the cam for opening the gripper-jaw.
Figure 12:
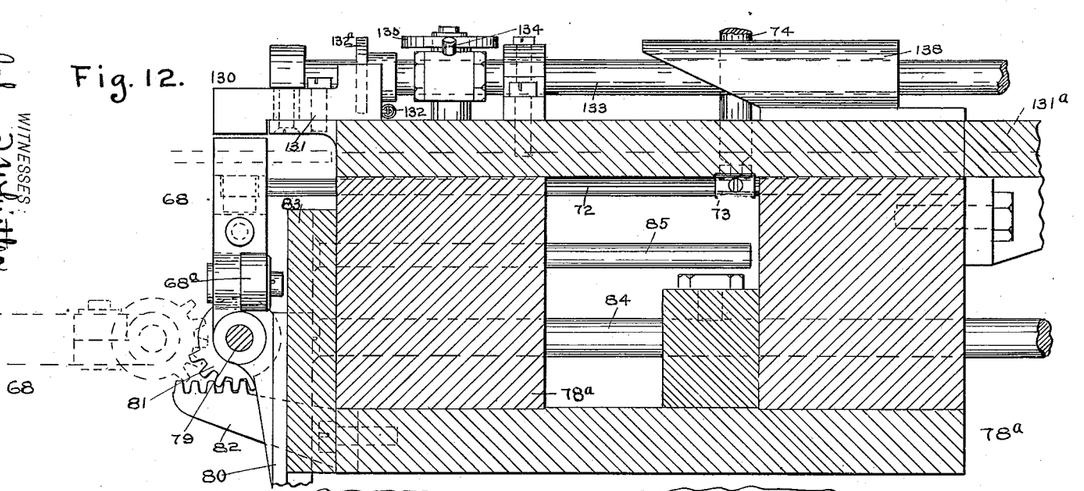
Fig. 12 is a vertical section, partly in elevation, taken on the line XII XII of Fig. 10.

The gripper 68 is secured to the shaft 79, which is journaled in a vertically-movable slide 80, and on one end of the shaft 79 is a gear or a segment 81, which is in mesh with the bracket 82, projecting outwardly from the head 78ᵃ, so that when the gripper is moved forward the gear 81, through the bracket 82, will cause the shaft 79 to rotate and through said shaft force the gripper downwardly to the position shown in dotted lines in Fig. 12. The slide 80 is arranged to move and be guided in a bar 83, the latter being connected to a longitudinally-movable bar 84, which, together with the rod 85, serves to properly guide the bar in the knotter-head. The rod 84 is connected to a lever 86, secured to a transverse shaft 87, and to said shaft is secured an arm 88, which is connected to a vertical rod 89, the latter being adjustable in length, if desired, as by a suitable turnbuckle, and connected to the arm or lever 90, arranged upon the transverse shaft 91, as shown in Fig. 5. This arm 90 has a projection or cam 92, adapted to be engaged by a cam 93, arranged on the shaft 78, so that when the latter rotates the cam 93 will lift the arm 90 and rod 89 and through the arm 88 and lever 86 will force the rod 84 and bar 83 forwardly, carrying therewith the gripper, which now rotates with its shaft, as already explained. The slide 80 may have a recessed portion engaged by a stem or rod 94, projecting outwardly from a bar or plate 95, carried by an arm or lever 96, loosely journaled on the shaft 87. This lever 96 is connected to a rod 97, which may be adjustable in length and has its upper end connected to an arm or lever 98, arranged to oscillate on the transverse shaft 91, and on said arm or lever is a projection 99, adapted to be engaged by the cam 100, so that at the proper time the lever 98 will be raised and through the rod 97, arm 96, and stud or projection 94 will raise or throw the slide 80 and gripper 68 vertically, the reverse movement of the slide 80 and the bar 83 being secured by the weight of the arms 96 and 88, respectively, and the parts connected therewith, though a spring or springs or other means may be employed to return the parts to their first or normal position. By this means the gripper is given a positive oscillatory and vertical movement.

Figures 6, 9A:
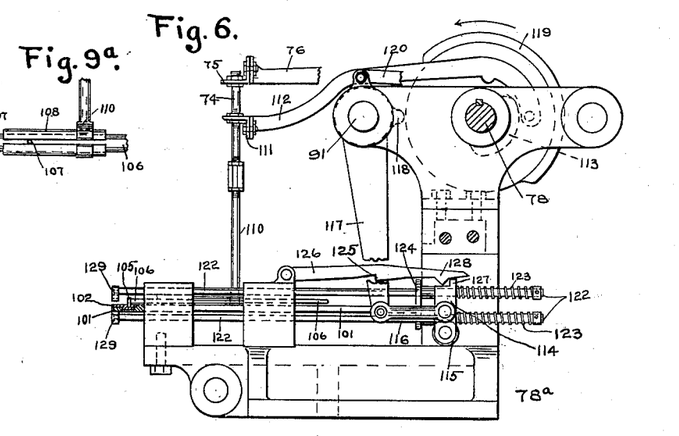
Fig. 6 is a vertical sectional view immediately to one side of the outer upright of the frame or support, illustrating the head in elevation and some of the parts broken away and others partly in section.
Figure 6A:
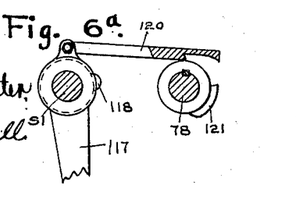
Figure 9:
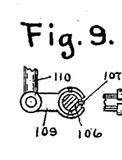
Figs. 9 and 9ª are a transverse vertical sectional view and a side elevation, partly broken away, respectively, of the connection for operating the shaft which moves the cord-piercing needle in one direction.
Figure 13:
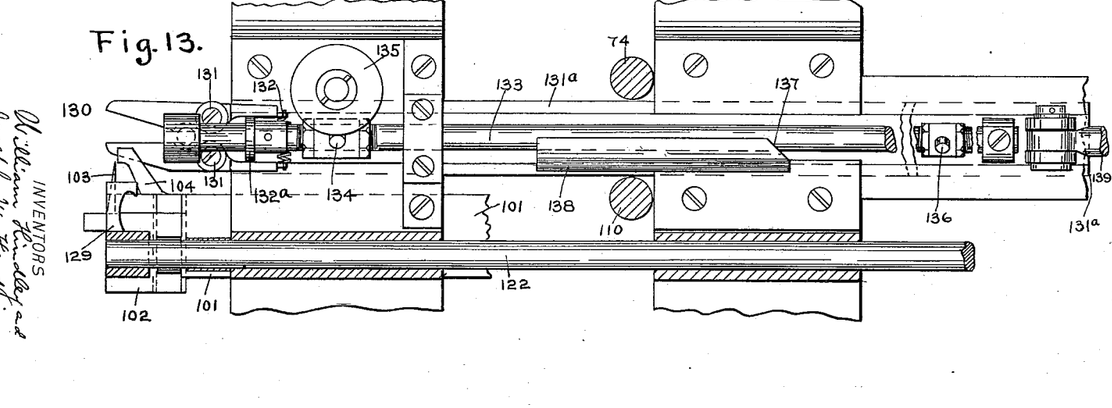
Fig. 13 is a plan view, partly in section, of the mechanism shown in Fig. 12, the nipper-slide being partly broken away and brought together in order to more clearly illustrate some of the parts.
Figures 18, 19, 20:
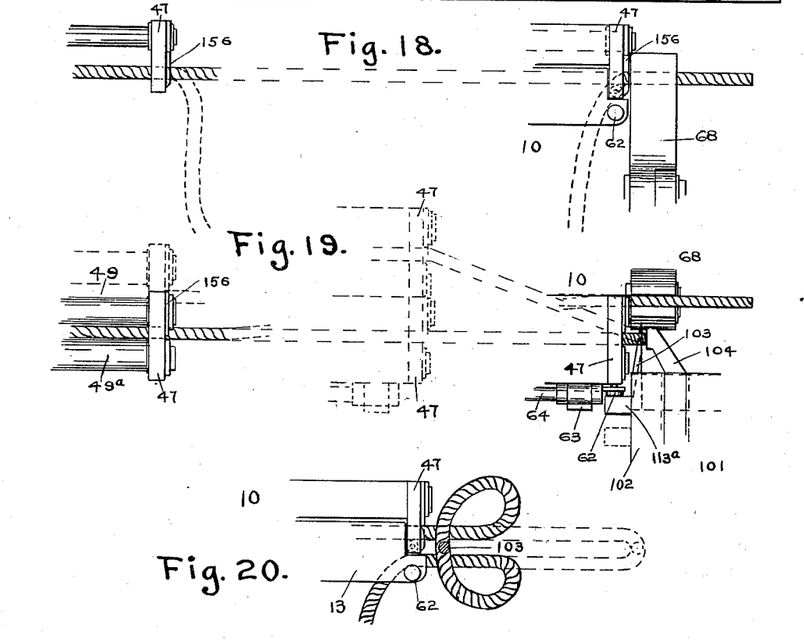
Figs. 18 to 24, inclusive, illustrate various positions of several of the main parts of the knotter and various steps of the knot while being formed.

For the purpose of positively holding the bend of the loop while the latter is being folded we may arrange a needle-bar 101, adapted to move back and forth in the head 78ᵃ, and on said needle-bar may be slidably held a plate 102, which carries a needle 103, adapted to pierce the cord and wedge the same against the bracket 104, as best shown in Figs. 13 and 19. This needle is adapted to be moved inwardly across or transversely of the head by a cam 105, Figs. 6 and 10, which may engage a recess in the plate or slide 102 and which projects outwardly from or which is secured to an oscillatory shaft 106. The shaft 106 has suitable bearings in the head and on the needle-bar 101 and is provided with a pin or lug 107, Figs. 9 and 9ᵃ, which engages a slot or groove in the sleeve 108 in order that the shaft may have a longitudinal movement, but still be engaged by said sleeve. Projecting outwardly from the sleeve 108 is an arm 109, which is connected to a vertically-movable rod 110, having its upper end connected to an angle plate or bar 111, arranged upon the inner end of the pivotal lever 112, as best shown in Fig. 6. This lever 112 has a portion thereof adapted to be engaged by a cam 113, arranged on the transverse shaft 78, so that as the latter rotates the lever 112 and rod 110 will be raised and through the arm 109, sleeve 108, and pin 107 will rock the shaft 106, so as to force the slide 102 and needle 103 inwardly, while the reverse direction or releasing of the needle is obtained by a projection, as 113ª, carried by the slide, Figs. 11 and 19, engaging a portion of the cord-carrier during the lateral movement of the carrier to fold or double the loop upon itself.

Figure 21:
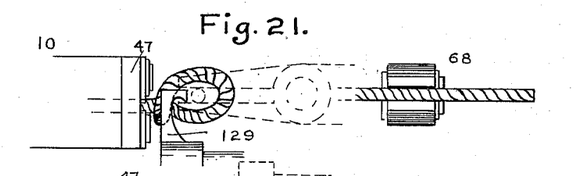

The needle-bar 101 is connected to the yoke 114, Fig. 6, which may have a roller, as 115, adapted to rest upon a portion of the frame or the head of the knotter and is connected to a link 116, the latter having one end thereof connected to the lever 117, arranged upon the transverse shaft 91. This lever 117 has a projection 118, adapted to be engaged by a cam 119, secured to the transverse shaft 78, so that when the cam is rotated the lever 117 will force the yoke 114 and needle-bar 101 inwardly, while the reverse movement of the yoke and the needle-bar may be obtained by a lever 120, Fig. 6ª, which has one end thereof connected to the lever 117 and its other end recessed or otherwise arranged to be engaged by a cam 121. The yoke 114 has the rods 122 passing therethrough, which are also slidably arranged in the head of the machine, and on said rods and interposed between the yoke and the outer ends thereof are springs 123. These rods are connected together by a plate 124, which normally bears against the yoke 114 and has its upper portion adapted to engage a recess or detent, as 125, in the pawl or lever 126, so as to hold said rods from backward movement to permit the needle-bar to retire independently of the rods. On the backward movement of the needle-bar a portion of the yoke, as 127, will engage the pawl 126, as at 128, so as to release the pawl from the plate 124, and as soon as the pawl is released the springs 123, which have been compressed by the yoke 114, will suddenly force the rods 122 outwardly to their normal position. The rods 122 at their inner ends are provided with folding-fingers 129, which are arranged to engage the upper and lower sides of the folded loop and double the same upon itself to the position shown in Fig. 21 during the lateral outward movement of the cord-carrier 10.

As a means for receiving the free end of the cord from the gripper 68 we may provide a nipper, as at 130. This nipper may comprise two members pivoted, as at 131, to the longitudinally-movable slide 131ª and normally retained in an open position by means of a spring, as 132, Figs. 10, 12, and 13, though if desired only one of the members of the nipper may be movable. The members of the nipper have their outer parts adapted to be engaged by a cam, as at 132ª, secured to the oscillatory shaft 133. The shaft 133 has a collar adjustably held thereon and provided with a projecting portion or pin 134, arranged in the path of a wheel 135, which is journaled upon the head 78ª, so that during the backward movement of the nipper the pin 134, engaging the periphery oft he wheel 135, will rock the shaft 133, so as to release the jaw or jaws of the nipper, according to whether one or both are movable. The shaft 133 is also provided with an adjustable collar at or near the rear or outer end thereof, which has a projection 136, adapted to engage an inclined surface, as 137, on the cam-block 138 in order that when the slide 131ª is moved forwardly or inwardly the pin 136, engaging the inclined surface of the cam-block 138, will operate the shaft 133 and cam 132ª and will close the jaws or members of the nipper. This slide 131ª has a portion thereof connected to a link 139, which has its outer end connected to an arm or lever 140, arranged to oscillate on the transverse shaft 141, as best shown in Fig. 5. The arm or lever 140 has a projecting portion 142, adapted to be engaged by a cam 143 on the shaft 78, so as to move the nipper inwardly, and connected to the said arm 140 is a lever 144, which has a portion thereof adapted to be engaged by a cam 145 in order that the arm 140 and the nipper 130 may be forced outwardly.

The slide 11 of the cord-carrier is provided with means for advancing the guide bar or head 47 forwardly or inwardly in order to throw or start the bend of the loop at the time that the nipper and cord-carrier retire to complete the knot. For this purpose we may arrange a spring 146 upon one of the rods, as 49ª, and interpose the same between the yoke or block 50 and a portion of the slide, this spring normally permitting certain independent movements of the guide-bar without being compressed; but the further movement of said bar will compress the spring and when the guide-bar is released it will be returned by the spring to the position shown in Figs. 14 and 15. The rod 49 has its rear or outer end yieldingly connected to a pivotal arm 147 by means of a spring, as at 148, Fig. 14, and on the arm 147 are pins or lugs 149, adapted to be yieldingly forced past the arm or lever 150 on the shaft 151 when the cord-carrier is moved forward. This arm 150 is given a sudden movement, so as to engage the pins or projections 149 and advance the rods 49 49ª and guide bar or head 47 by a link 152, having one end thereof connected to the arm or lever 150 and its other end connected to an oscillating arm or lever 153. (Best shown in Fig. 16.) The lever 153 has a portion thereof connected to a bar or lever 154, which has a portion thereof arranged so as to be engaged by a cam 155, secured to the shaft 23, so that as the latter rotates the arm or lever 153 will be rocked on the shaft 18, and through the link 152, lever 150, pins 149, and arm or link 147 the latter will advance or force the guide bar or head inwardly, compressing the spring 146, which as soon as released will return the guide bar or head back to the position shown in the figures referred to.

The cord after the knot has been tied may be cut or separated in any desired manner; but we prefer to use the form and arrangement of cutter shown in the drawings. Here the guide bar or head 47 forms one member of the cutter, while to the rod 49 is secured a cutter-blade or knife 156, which when oscillated is adapted to cut the cord across the face of the guide bar or head. The rod 49 may have a link or links 157 secured thereto, which are connected to a transverse bar 158, the outer end of which may engage a roller carried by the arm 159, which is pivoted to the support 12. This arm has a lip or projection thereon adapted to be engaged by the bracket 40 at a predetermined time, so as to rock said arm on its pivot, and through the roller thereon bar 158 and arms or links 157 will rock the shaft in its bearing, while the reverse direction of the bar 158 may be secured by a spring, as at 160, or in any other suitable manner.

The main operating-shaft 161 and the transverse shaft of the knotter may be operated in any desired manner, and, as shown, the shaft 161 is provided with beveled gears 162, which are in mesh with similar larger gears 163, arranged on the shafts 23 and 78, the shaft 161 being provided with a pinion 164, which is in mesh with a gear 165, arranged on the shaft 59, in order that the latter may be rotated and lateral movement imparted to the support and cord-carrier 12, as hereinbefore explained. The transverse shaft 23 may have a large gear 166, Fig. 15, secured thereto, which meshes with a smaller spur-gear 167 on the shaft 18, which is adapted to rotate with a larger gear 168, the latter being in mesh with a smaller gear 169 on the shaft 23, to which gear the cams 26, 27, and 28 for operating the segmental gear 17 are secured.

The construction and operation of the invention will be readily understood from the foregoing description when taken in connection with the accompanying drawings.

Figure 1:
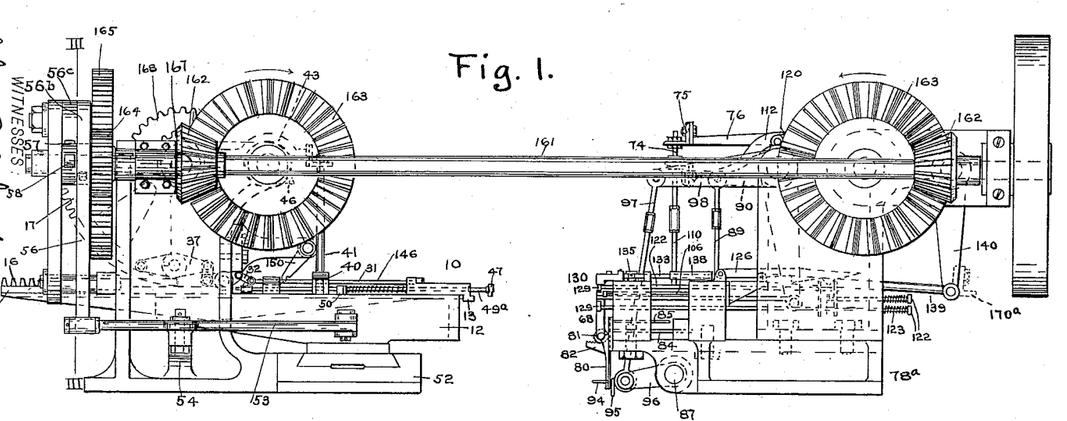
Figure 1 represents a side elevation of one form of knotter embodying our invention.
Figure 2:
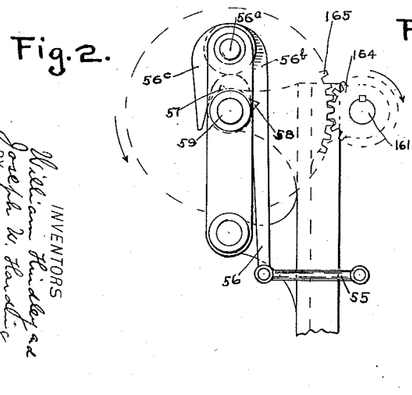
Fig. 2 is a detail end elevation, partly broken away, of the mechanism for imparting a lateral movement to the cord-carrier and its support.
Figure 22:
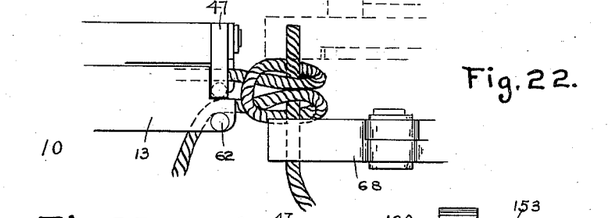
Figure 23:
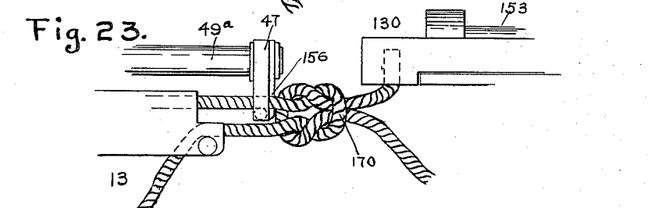
Figure 24:
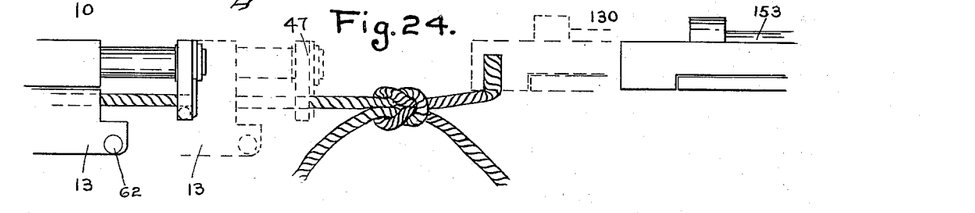

Assuming the parts to be in the position shown in Fig. 1 and the cord arranged as in Fig. 15, so as to be clamped by the clamping-jaws of the cord-carrier 10, it will be seen that if the disk 22 is operated by the mechanism hereinbefore explained, so that the cam 21 engages the projection 19 on the segmental gear 17, the cord-carrier 10 will be advanced inwardly, causing the guide head or bar 47 to be forced backward into the recess of the carrier by coming in contact with the inner face of the gripper 68. The movable jaw of the gripper has at this time been opened by the action of the cam 71 and its actuating mechanism, and as the carrier continues to be forced forward the backward movement of the guide-bar 47 guides and leaves the end of the cord which is free to slide therein between the jaws of the gripper, as shown in Fig. 18, and when the carrier reaches its extreme throw the movable jaw 68ª of the gripper is released and by the spring 69 rigidly grasps and holds the free end of the cord. The movable clamping-jaw 14 of the cord-carrier, through the cam 29, cam-rod 30, rod 31, rocking arm 37, and its connections with the rod 31, is operated by the pin 38 being engaged by the bracket 40 on the rod 41, the latter being operated by one of the cams, as 45, on the shaft 23 engaging the arm 43, so as to tilt the rocking arm 37 on its pivot and force the cam-bar 30 rearward to release the clamping-jaw. The cam 26 now engages the lever 24 and through the segmental gear 17 moves the cord-carrier back to its first position, leaving the end of the cord in the jaws of the gripper. If wood is to be bundled, the shaft 161 may be operated, and the head and mechanism carried thereby may be moved outwardly with the compressing-jaws of the bundling-machine in the manner described in our application for a patent for improvement in bundling-machines, Serial No. 658,256, filed November 12, 1897, and in our application for improvement in knotters hereinbefore referred to. At this time the wood falls into the compressing-jaws of the bundling-machine, carrying the string or cord therewith, the latter at this time slipping past the clamping-jaws of the cord-carrier and, through the guide head or bar 47, from the source of supply, the compressing-arms of the bundling-machine and the head being again returned in order to suitably compress the wood, this particular feature and the compressing-arms not being shown herein, as they form no part of this invention. The cord-carrier and the support are now given a lateral outward movement by the cam 57, portion 56ᶜ of the lever 56, link 55, and lever 53 in order to bring the cord in alinement with the wedging-block 104 of the needle-bar. The cord-carrier is again moved forward by the cam 20 on the disk 22, as already described, and in doing so carries the cord forward in position to be pierced by the needle 103, as shown in Fig. 19, the needle being forced inwardly by the cam 105 and its actuating mechanism. As the needle pierces the bend in the cord the retaining bar or bolt 62 is thrown below the lower side of the loop by the arm 63, shaft 64, rod 65, and wheel 66 being moved clear of the support 12. The cord-carrier now retires by the action of the cam 27 engaging the lever 25 of the segmental gear 17, so as to place the same to one side of the vertical center of the bundle or body to be bound in order to secure the proper length of loop. The clamping-jaw 14 of the carrier is now operated, as already described, so as to grasp and hold both sides of the loop, the guide-bar at this time being in the recess in the carrier, having been forced therein during the forward movement of the carrier. The cord-carrier and its support 12 are then moved inwardly transversely of the machine by the cam 61 engaging the portion 56ᵇ of the lever 56 to their normal position, which being at one side of the plane of the needle, as shown in dotted lines in Fig. 19, allows the loop to be bent or folded properly. The needle-bar and folding-fingers are now moved forward or inwardly up to the face of the cord-carrier by the yoke 114, link 116, arm or lever 117, and cam 119 engaging the projection 118 on said arm, by which movement the plate 124 on the rods 122 will engage the recess 125 in the pawl 126 and the loop will be folded over, as shown in Fig. 20. The cord-carrier and its support are again moved outwardly transversely of the machine by the lever 53, link 55, oscillating lever 56, and cam 58 engaging the upper portion 56$^c$ of the said lever. This movement causes the upper and lower sides of the folded loop to engage the ends of the folding-fingers 129, so as to double the folded loop upon itself, as shown in plan in Fig. 21, the needle being released from the loop by the lateral movement of the carrier, owing to the projection 113$^a$, carried by the needle-slide, engaging a portion of the cord-carrier 10 before the completion of this movement. The gripper 68 is then forced forward by the rod 84 and its actuating mechanism, and in doing so the gear 81 by engaging the rack 82 will throw the gripper to the position shown in dotted lines in Fig. 12, so that the free end of the cord projects upward, the gripper being moved forward sufficiently to place the cord in position to pass through the doubled loop, as shown in dotted lines in Fig. 21. The support and the cord-carrier 10 are now moved inwardly transversely of the machine to their normal position by the cam 60 engaging the portion 56$^b$ of the lever 56. An upward movement is now given to the gripper by the slide 80, pin 94, arm 96, and its actuating mechanism, so as to force the free end of the cord through the doubled loop, as shown in Fig. 22. The nipper 130 is now moved forward by the slide 131$^a$, link 139, lever 140, projection 142, and cam 143, and during this forward movement the projection 136 will engage the inclined surface 137 of the cam-block 138 and through the cam 132$^a$ will actuate the nipper-jaws, so as to grasp and rigidly hold the free end of the cord. Immediately that the nipper grasps the free end of the cord the movable jaw of the gripper is released and the latter returns to its former position, at which time the projections on the arms 90 and 98, respectively, will be disengaged from their cams, so that the gripper may return to its normal position. The nipper continues to move forward until it reaches the center of the bundle, so as to centralize or position the knot. At this time the thread or cord carrier is being retired or forced outwardly, and as the carrier retires the wheel 66 will ride up the incline plane 67 of the support 12 and will withdraw the retaining-bar 62 from beneath the lower side of the loop, the block or yoke 50 being also caused to engage the pin 51 and force the guide bar or head 47 outwardly to the position shown in Fig. 15. When the cord-carrier is retired sufficiently, the guide head or bar is given a further inward movement by the arm 147 on the rod 49 being engaged by the rock-lever 150, which is actuated as hereinbefore explained. This further movement of the guide head or bar 47 engages the bend of the loop and throws the same outwardly and over from the position shown in Fig. 22 to that shown at 170, Fig. 23, so as to more readily cause the parts of the knot to slip and interlock. As the carrier retires the nipper is being retired by the link 139, oscillating lever 140, lever 144, and cam 145 on the shaft 78, so as to complete the knot, as shown in Fig. 24. During this movement the projection 134 on the shaft 133 engages the wheel 135 and rotates the cam 132$^a$, so that the spring 132 may release the jaws of the nipper from the cord. The shaft 49, connected to the guide-bar 47, is now rocked in its bearings by the bar 158, pivoted arm 159, and vertically-moving bracket 40 on the rod 41, as heretofore explained, so as to move the cutter-blade or knife 156 and sever or cut the cord at the proper point, after which the cord is advanced by the cord-carrier in position to be engaged by the gripper and again retired to its normal position for the next bundle of wood or material, as hereinbefore described.

We thus provide an efficient knotting device which will tie a reef or square knot close to a practically-unyielding substance and which will positively hold and guide the cord during its various movements while the knot is being tied.

Figure 10:
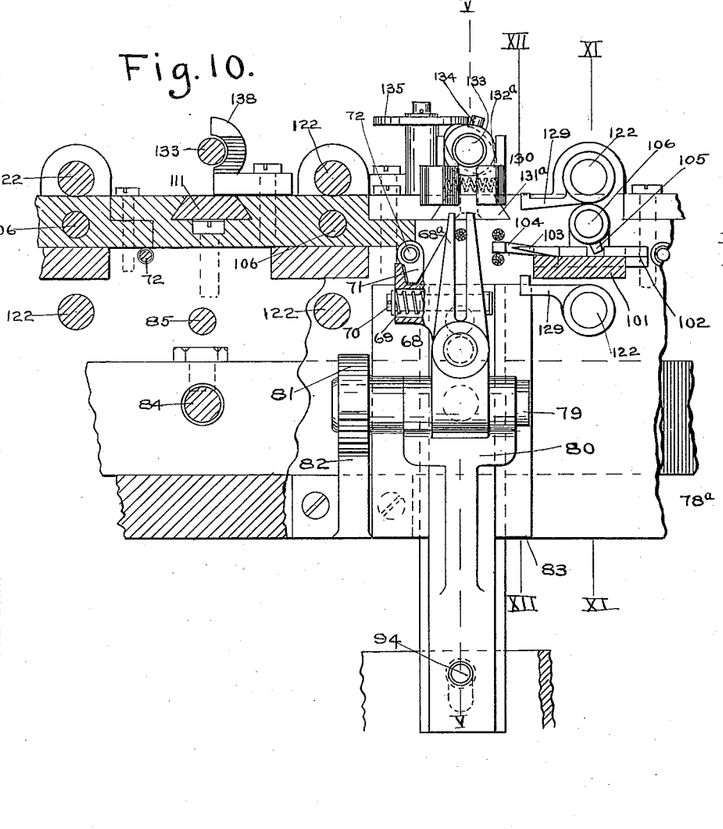
Fig. 10 is a front elevation, partly in section, of the knotter-head and some of the parts supported thereby.
Figure 11:
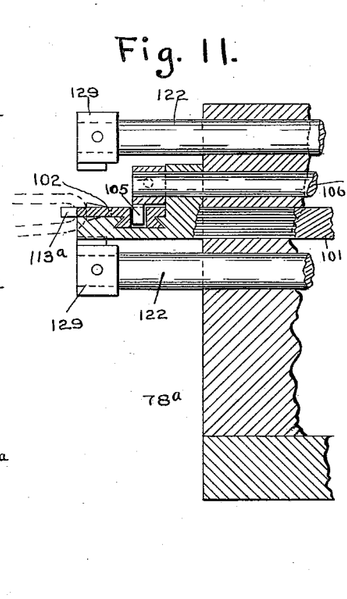
Fig. 11 is a vertical section taken on the line XI XI of Fig. 10.
Figure 17:
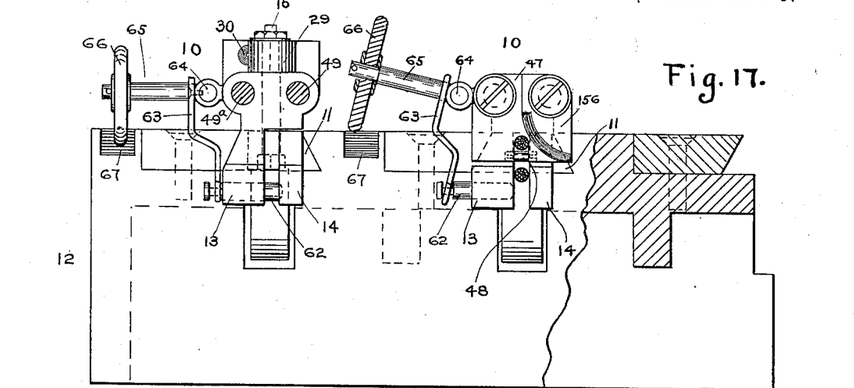
Fig. 17 is an inner end elevation, partly in section and partly broken away, of the cord-carriers and their support.

As before stated, the construction and operation of a single device only have been referred to, though ordinarily and particularly when bundling wood in lengths so as to ultimately cut them into merchantable bundles or packages, as described in our application for a patent for bundling-machines heretofore referred to, a series of such devices are arranged, usually about twenty in number, though more or less may be used, which are connected so as to operate in unison. In Figs. 10, 14, and 17 there is a suggestion, while not carried out in detail, of how two or more of such devices may be arranged, and when used in series the transverse shafts, cams, segmental gear, and rack for the cord-carriers are arranged at opposite ends of the machine, while the angle bars or plates 75 and 111 and an angle-bar, as at 170$^a$, (shown in dotted lines in Fig. 5,) may extend entirely across the machine, to which the rods 74 and 110 and the links, as 139, respectively, of each knotter may be connected. The shaft 87 and the bar 95, having an arm or lever 86, and a projection 94, respectively, for each knotter may also extend across the machine for operating each gripper. The shaft 34 on the cord-carrier may extend entirely across the machine and may have an arm for each knotter, which is connected to mechanism.

similar to that shown for operating the movable jaw of the carrier, the slides of each carrier also being connected by a bar, as 171, Fig. 14, so that they may be simultaneously moved forward or backward. The bar 158 may also extend entirely across the machine to operate the rod 49$^a$ and cutter 156 of each knotter, and the shaft 151 may also extend across the machine, on which may be arranged arms like that shown at 150 for similarly operating the cutter or knife of each knotter.

While we have used the term "cord or thread" throughout the description to indicate the binding material, it is to be understood that this term is intended to include any material which may be tied or formed into a knot by such a device.

It will be understood that instead of the cord-carrier having a lateral movement the head on the needle-bar may be given a lateral movement, as described in our pending application for improvement in knotters hereinbefore referred to, that the cord-carrier may be frictionally held in any suitable manner in a medium position or at that point where the knot is being formed, if desired, and that some of the parts may be dispensed with or others substituted therefor without departing from the spirit of our invention.

Having thus described our invention, we claim as new and desire to secure by Letters Patent—

1. A device of the kind described, comprising a laterally and longitudinally movable cord-carrier, means for moving the carrier, and means for receiving the cord from the carrier for folding and completing the knot, substantially as described.

2. A device of the kind described, comprising a cord-carrier, means for operating the carrier, a gripper, and means carried by the carrier adapted to guide the free end of the cord into the jaws of the gripper when the carrier is moved forward, substantially as described.

3. A knotter, comprising a two-way reciprocating cord-carrier, its two paths being at right angles to each other, a gripper adapted to receive the cord from the carrier, a nipper adapted to receive the cord from the gripper, and means for operating the nipper and gripper.

4. A knotter, comprising a two-way reciprocating cord-carrier, its two paths being at right angles to each other, means for operating the carrier, a gripper adapted to receive the cord from the carrier, a needle adapted to engage and rigidly hold a portion of the cord, fingers for engaging a portion of the cord when the carrier is moved laterally in one direction, a nipper adapted to receive the cord from the gripper, and means for operating the several parts.

5. In a device of the kind described, the combination with a movable carrier, of an independently-movable guide-bar arranged on the carrier and adapted to guide the end of the cord during the movement of said carrier, and means for operating the guide-bar, substantially as described.

6. In a device of the kind described, the combination of the movable cord-carrier, a guide-bar arranged on the cord carrier, a rod secured to the guide-bar and having a bearing on the carrier, a block or yoke secured to the rod, and a pin or projection arranged to engage the block or yoke so as to move the guide-bar independently of the carrier, substantially as described.

7. In a device of the kind described, the combination with the movable cord-carrier, of a guide-bar, a rod on which the guide-bar is arranged, an arm or link yieldingly held to said rod, a lever and mechanism for operating the lever adapted to force the rod and guide-bar inwardly, substantially as described.

8. A knotter, comprising a cord-carrier, means for operating the carrier, a guide-bar adapted to move independently of the carrier, a gripper, means for folding and doubling the loop upon itself, a nipper adapted to receive the cord from the gripper, means for operating the nipper and the gripper, and mechanism for further advancing the guide-bar prior to the engagement of the free end of the cord by the nipper to start the bend of the loop while the knot is being formed, substantially as described.

9. In a device of the kind described, the combination with the movable cord-carrier having clamping-jaws thereon, of a guide-bar, rods secured to the guide-bar and movable thereon, means, as the yoke and pin or projection, for operating the guide-bar in one direction independently of the carrier, a spring arranged on one of the rods, an arm yieldingly held to the other rod and having pins thereon, an oscillatory lever and mechanism for operating the same so as to engage the yielding arm and impart further movement to the guide-bar, substantially as described.

10. In a device of the kind described, a cord-carrier, comprising a slide having a jaw fixed thereto, a movable jaw pivoted to the slide between which and the fixed jaw a cord is adapted to be clamped, a cam fixed to the movable jaw at the pivot thereof, a cam-bar adapted to operate the cam in one direction, and means for operating the cam-bar, substantially as described.

11. In a device of the kind described, the combination with the movable cord-carrier having a fixed jaw and a movable jaw thereon, of a cam rotatable with the movable jaw, a sliding cam-bar adapted to engage the cam and move the same in one direction, a rod secured to the sliding cam-bar, a link connected to the rod, a rocking block pivoted to the slide, and means for operating the rocking block so as to force the rod and sliding cam-bar in either direction, substantially as described.

12. In a knotter, the combination with the movable cord-carrier having a fixed and a movable jaw, of a cam secured so as to move with the movable jaw, a sliding cam-bar adapted to engage the cam and move the same in one direction, a rocking block, a toggle-joint connection between said block and the sliding cam-bar, a rocking arm connected to the rocking block, and means for operating the rocking block, substantially as described.

13. In a device of the kind described, the combination with the movable cord-carrier, of a retaining bar or bolt movable thereon and adapted to be thrown beneath the lower side of the loop, an arm connected to the retaining-bar, a rod to which the arm is secured, a shaft or stud secured to the rod, and a wheel mounted on the shaft and adapted to oscillate or rotate the rod in its bearings so as to operate the retaining-bar, substantially as described.

14. In a device of the kind described, the combination with the movable cord-carrier, of cutting mechanism mounted upon and movable with the carrier, and means for operating the cutting mechanism, said mechanism comprising a movable member, and a guide-bar for the cord forming the fixed member thereof, substantially as described.

15. In a device of the kind described, the combination with the cord-carrier having suitable clamping-jaws thereon, a guide-bar arranged on the carrier and forming a fixed member of the cutter, a movable cutter blade or knife arranged on the guide-head, a shaft or rod secured to the movable cutter-blade, and means for rotating the shaft, substantially as described.

16. The combination with the movable cord-carrier, of a cutter-blade arranged so as to move with the carrier, a shaft or rod to which the cutter-blade is secured, links secured to the shaft or rod, a bar connected to the links, and an arm and mechanism for operating the same so as to move the bar and oscillate the rod in its bearings so as to impart a shearing action to the cutter-blade, substantially as described.

17. The combination of a movable cord-carrier, a support in which the carrier is mounted, a lever pivoted intermediate its ends and connected at one end to the support, a link connected to the other end of the lever, an oscillating lever connected to one end of the link, and cams for operating the lever in both directions so as to impart lateral movement to the cord-carrier and its support, substantially as described.

18. In a device of the kind described, a gripper comprising two members between which the cord is adapted to be held, a longitudinally-movable rod adapted to force the gripper inwardly, means for operating the rod, a shaft or stud to which the gripper is secured, a pinion or segmental gear rotatable with the shaft, and a rack in mesh with the pinion or segmental gear, substantially as described.

19. In a device of the kind described, a gripper, comprising two members between which the cord is adapted to be held, a longitudinally-movable rod, to which the gripper is secured so as to move therewith, a shaft to which the gripper is secured, a slide in which the shaft is journaled, and means for imparting a vertical movement to the slide and the gripper, substantially as described.

20. In a device of the kind described, a gripper comprising two members between which the cord is adapted to be held, a shaft to which the gripper is secured, a pinion or gear secured to the shaft, a rack adapted to engage the teeth of the gear, a movable rod, a bar secured to said rod, a slide vertically movable in the bar, means for moving the rod longitudinally, and means for imparting a vertical movement to the slide and the gripper, substantially as described.

21. In a knotter, the combination with the head, of a needle-bar slidingly held in said head, a needle carried by the needle-bar, a bracket projecting outwardly from said bar, and means for operating the needle so as to wedge the cord when pierced by the needle between the same and the bracket, substantially as described.

22. In a device of the kind described, the combination of the head, a needle-bar, a needle held on said bar, means for operating the needle transversely of the bar in one direction, a yoke secured to the needle-bar, a link connected to the yoke, an oscillating arm or lever connected to the link, and means for operating the oscillatory lever backward and forward, substantially as described.

23. In a device of the kind described, the combination with the needle-bar, and the needle movable transversely thereof, of a yoke secured to the bar, rods slidingly arranged in the yoke so as to be moved in one direction thereby, means for holding the rods when in a predetermined position so that the needle-bar may retire independently of said rods, means for releasing the rods, and springs arranged around the rods for retiring the same when released, substantially as described.

24. In a device of the kind described, the combination with the head, of slidable rods having folding fingers thereon arranged in the head, a yoke slidingly arranged on the rods, means for moving the yoke back and forth, springs arranged on the rods between the ends thereof and the yoke, a plate securing the rods together, a pawl having a portion thereof adapted to be engaged by the plate on the rods when forced forward, and means carried by the pawl arranged in the path of movement of the yoke so as to release the pawl from engagement with the plates on the rods, substantially as described.

25. In a device of the kind described, the combination with the head, of the needle-bar arranged in the head, a needle movable transversely in the needle-bar, a cam engaging a portion of the needle, a rock-shaft on which the cam is arranged, a sleeve having a pin-and-slot connection with the shaft, an arm projecting outwardly from the sleeve, and means for operating the arm so as to rock the shaft and move the needle in the needle-bar, substantially as described.

26. In a device of the kind described, the combination with the movable slide, a nipper carried by the slide and comprising two members, a cam actuating the movable member or members of the nipper, a shaft on which the cam is arranged, and collars carried on the shaft and adapted to engage fixtures on the head to rock the shaft in its bearings at predetermined points, substantially as described.

27. In a device of the kind described, the combination with the movable slide, of a nipper comprising two members pivotally arranged on the slide and normally retained in an open position by a spring, a cam adapted to force the jaws toward each other to clamp the cord, a shaft on which the cam is arranged, a wheel or disk arranged on the head, a collar secured to the shaft and having a projection adapted to engage the disk or wheel for operating the cam and shaft in one direction, a cam-block arranged on the head, a second collar provided with a projection adapted to engage said cam-block for operating the shaft in the opposite direction, and mechanism for operating the slide, substantially as described.

WILLIAM HINDLEY.
JOSEPH W. HARDING.

Witnesses:
J. A. E. CRISWELL,
BERTHA DEYO.